United States Patent [19]

Pace, II

[11] Patent Number: 5,712,899
[45] Date of Patent: Jan. 27, 1998

[54] MOBILE LOCATION REPORTING APPARATUS AND METHODS

[76] Inventor: Harold Pace, II, 1632 Apt. #5, San Diego, Calif.

[21] Appl. No.: 588,202

[22] Filed: Jan. 19, 1996

Related U.S. Application Data

[63] Continuation-in-part of Ser. No. 281,481, Jul. 26, 1994, which is a continuation-in-part of Ser. No. 192,851, Feb. 7, 1994, abandoned.

[51] Int. Cl.$^6$ .............. H04Q 7/20; H04Q 7/38
[52] U.S. Cl. ............. 379/58; 379/59; 455/33.1; 342/357; 340/988
[58] Field of Search .......... 379/58, 59; 455/33.1; 342/350, 352, 357, 385–388, 407, 409, 460, 451, 457; 340/988–990, 992, 993, 995

[56] References Cited

U.S. PATENT DOCUMENTS

| | | | |
|---|---|---|---|
| 5,089,826 | 2/1992 | Yano et al. | 340/995 |
| 5,223,844 | 6/1993 | Monsell et al. | 342/357 |
| 5,235,633 | 8/1993 | Dennison et al. | 342/357 |
| 5,479,482 | 12/1995 | Grimes | 379/59 |

FOREIGN PATENT DOCUMENTS

| 4152724 | 5/1992 | Japan | 379/58 |
|---|---|---|---|

*Primary Examiner*—William Cumming
*Assistant Examiner*—Nay Maung
*Attorney, Agent, or Firm*—Gray Cary Ware & Freidenrich

[57] ABSTRACT

The present invention provides for an apparatus which allows an operator of a mobile communications unit, configured to receive and process signals generated by a Global Positioning System (GPS) and transmit them to a base communications unit, to be in voice communication with an operator of the base communications unit, wherein the base unit operator can provide the mobile communications unit operator with geographic location information by voice communication while the base unit receives the processed GPS signals, translates these signals into the geographic location information and provides a visual image of the information to the base unit operator.

15 Claims, 10 Drawing Sheets

FIGURE 4
| LOCUS DISPLAY SETTING | LOCUS NON-DISPLAY SETTING |
|---|---|
| — | — |
| — | — |
| — | — |
FIGURE 5
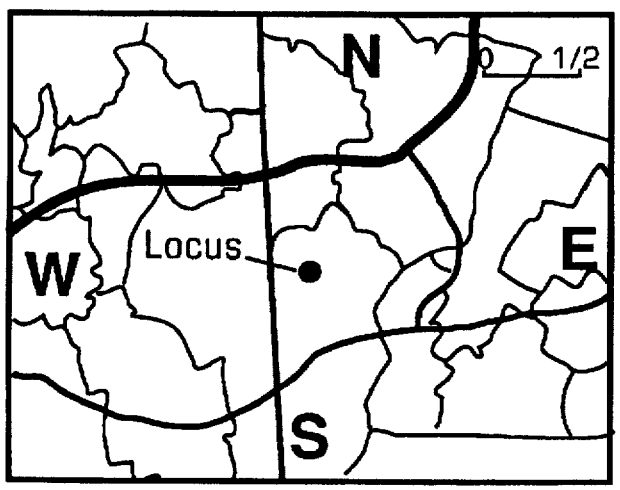
FIGURE 6
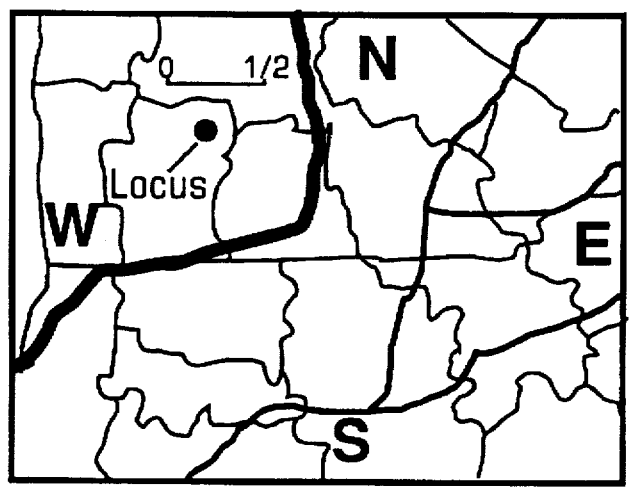

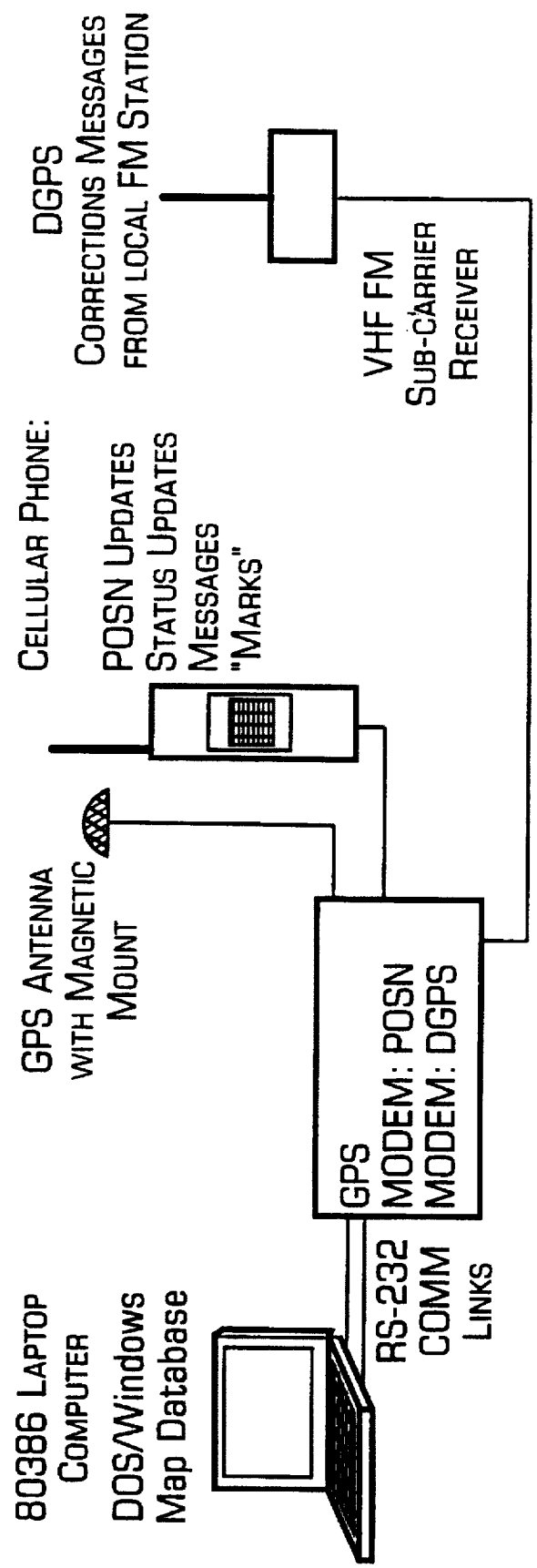

MOBILE LOCATION REPORTING APPARATUS AND METHODS

RELATED APPLICATION DATA

This application is a continuation-in-part of U.S. patent application Ser. No. 08/281,481, filed Jul. 26, 1994, which in turn is a continuation-in-part of U.S. patent application Ser. No. 08/192,851, filed Feb. 2, 1994, now abandoned.

BACKGROUND OF THE INVENTION

Mobile telephone technology provides convenience to and increases the productivity of mobile unit operators by enabling them to communicate with other mobile or land based operators while in transit or where other communications options are unavailable. The technology enables a mobile operator to provide a Mobile Telephone Switching Operator (MTSO), as well as the operator of a base unit, with geographical location data based upon the use of a Global Positioning System (GPS). GPS's are satellite-based navigation systems which transmit real time signals which may be received and computed into geographic position information. Receivers of such signals have been configured inside mobile telephones, with the signal subsequently transmitted to a base unit, with the base unit serving as the translator of the GPS signal into latitude and longitude data. This information gives the base unit operator the ability to track the location of the mobile telephone and, accordingly, the vehicle in which it is situated.

Receivers of GPS signals have also been provided in vehicle navigation systems, such that the vehicle operator, utilizing cartographic information stored in Read Only Memory as well as a video display screen, can have the location of the vehicle provided in a map display. The prior art further provides vehicle tracking systems which provide location information to base units, with such vehicle tracking systems utilizing land-based geographic location systems or location systems which utilize the identification signals of cell sites of cellular telephone systems.

Another prior art system which utilizes the GPS is the Data Logger System produced by Rockwell International. The Data Logger System is a portable positioning and data storage system that brings together satellite positioning technology with a set of robust geo-processing tools in a productive integration, that allows users to record accurate geo-reference positions and provides a textual description of events, observations, and findings associated with a location.

The system consists of a Portable Remote and a Base Station. The Portable Remote is portable data logging unit used for capturing field data. The Base Station is used for processing field data captured by the Portable Remote. The Base Station is used for generating reports and graphical representations for locating each observable defined by the Portable Remote. The system has Differential Global Positioning System (Differential GPS) capability.

The benefit of the tracking technology has provided base unit operators, for example, trucking companies, rental car fleet operators, and sales managers, with the ability to track the geographic location of their vehicles. Yet, such base unit operators have not been provided with sophisticated cartographic displays with an illuminated geographic locus of the mobile unit operator. In addition, the prior art does not provide base unit operators and mobile unit operators the present ability to be in audio communication while the mobile operator is transmitting the telephone signal to the base unit. In addition, the ability to quickly and easily reach a predetermined base operator during an emergency, or while one is lost, is not presently available.

BACKGROUND ART

The prior art provides a number of systems which provide geographic information to a base operator, including U.S. Pat. No. 5,043,736 which is directed to a portable locating unit useful both as a cellular telephone and portable global positioning system which provides latitude and longitude to a base unit. This system provides a base unit with the GPS signal but does not allow the operator to communicate with the base unit as the GPS signal is provided without the benefit of a dial tone. U.S. Pat. No. 5,155,689 provides a cellular communications-based locating apparatus in which the geographical information is generated from signals transmitted by the individual cellular transmitter sites; that is, the cell that the mobile unit is presently tuned to provides an identification signal that is decoded by a base unit and provides the base unit operator with an estimate of the vehicle's location. U.S. Pat. No. 5,218,367 provides a vehicle tracking system which utilizes a monitor which communicates via the cellular telephone network, with said monitor attached to sensors and able to process and transmit an alarm signal to a base unit should the sensors be activated. Tracking of the vehicles is based upon the signal generated from the cell site which receives the call from the monitor. U.S. Pat. No. 5,208,756 provides a vehicle locating and navigating system based upon land-based navigational networks.

Other prior art references provide navigation systems which are installed into a car, for example, U.S. Pat. No. 5,189,430 provides a navigation system which is installed in an automobile and determines its position utilizing satellite navigation. U.S. Pat. No. 5,193,215 provides a location signalling device which receives coordinate information from a location computing device, eg., LORAN, NAVSAT, or GPS or from an individual through the use of a keypad. Such a device, when activated, provides an emergency signal transmitted via, eg., VHF or SSB radio. U.S. Pat. No. 5,220,509 provides a vehicle navigation system which includes a GPS receiver, and a self-contained navigation system which includes a geomagnetic sensor and a vehicle velocity sensor, wherein all this geographic position data is fed through a microprocessor, with the microprocessor providing the automatic correction of the self-contained navigation system as well as providing the driver with its locus in connection with a cartographic display. U.S. Pat. No. 5,179,519 provides a navigation system for a vehicle utilizing GPS location information and further provides the operator with the direction of the moving vehicle in relation to a display utilizing map information stored in Read Only Memory. U.S. Pat. No. 5,155,688 further provides a vehicle navigation system, whereby a satellite generated location detection system and a self-contained location detecting system generate data, with this data subsequently synthesized to provide synthetic location data to the vehicle operator. This synthesized data is then provided to an on-road location determinator which determines the location of the vehicle in accordance with road map data stored in a Read Only Memory and the synthesized location data.

SUMMARY OF THE INVENTION

The present invention solves the problems not addressed by the prior art: a cellular telephone which receives GPS signals and can transmit such signals to a telephone associated with a base unit while simultaneously transmitting an audio signal; the base unit reachable by dialing a pre-designated telephone and configured to receive the GPS signals and translate them into geographical information while allowing the operator of the base unit to be in audio communication with the operator of the mobile cellular telephone.

The present invention provides for a novel geographic location information apparatus which provides location information to an operator of a mobile communications unit comprising a mobile communications unit and a base communications unit. The mobile communications unit comprises a means for receiving signals from a Global Positioning System (GPS), a means for processing said global positioning system signal, and a cellular telephone means for transmitting the processed global positioning system signal and a voice communications signal from the mobile unit operator and for receiving geographic position information. The base communications unit comprises a telephone means for receiving a signal from the mobile unit, a means for processing said signals and extracting voice and global positioning information, an audio communication means utilizing said voice information and allowing an operator of the base unit to communicate with the mobile unit operator, and a decoding means for processing the global positioning information into geographic position information, and a visual display means for conveying the geographic position information to a base unit operator, wherein the processing of the telephone signal at the base unit allows the base unit operator to be in audio communication with the mobile unit operator while simultaneously analyzing said video display.

The invention also provides a mobile telephone which provides geographic location information comprising a means for receiving a global positioning system signal, a means for generating a timing signal, a means for computing a location information signal from the global positioning signal and the timing signal, a Read Only Memory which stores map displays, wherein said computing means retrieves a map display from the Read Only Memory corresponding to said location information signal and encodes a video data signal, and a visual display means for displaying said video data signal.

BRIEF DESCRIPTION OF THE FIGURES

FIG. 4 provides the menu which will be displayed on the visual display means on phones configured as in FIGS. 1 and 2, as well as on a base unit.

FIGS. 5 and 6 provide examples of a visual display means displaying map displays in the locus mode which would be present on the phones of FIGS. 1 and 2 and a base unit.

FIG. 14 provides a block diagram of a Vehicular Remote Station. The primary elements are a Laptop Personal Computer, a GPS, an FM Sub-Carrier Receiver, a modem, a GPS antenna with a magnetic mount, a cellular phone, and a cellular phone link. The VHF FM sub-carrier Receiver and modem are used to convert Digital GPS corrections data into a form the GPS can use in determining position. The cellular link is used to transmit position updates from the Cellular Remote to the Base Station.

DETAILED DESCRIPTION OF THE INVENTION

Figure 1:
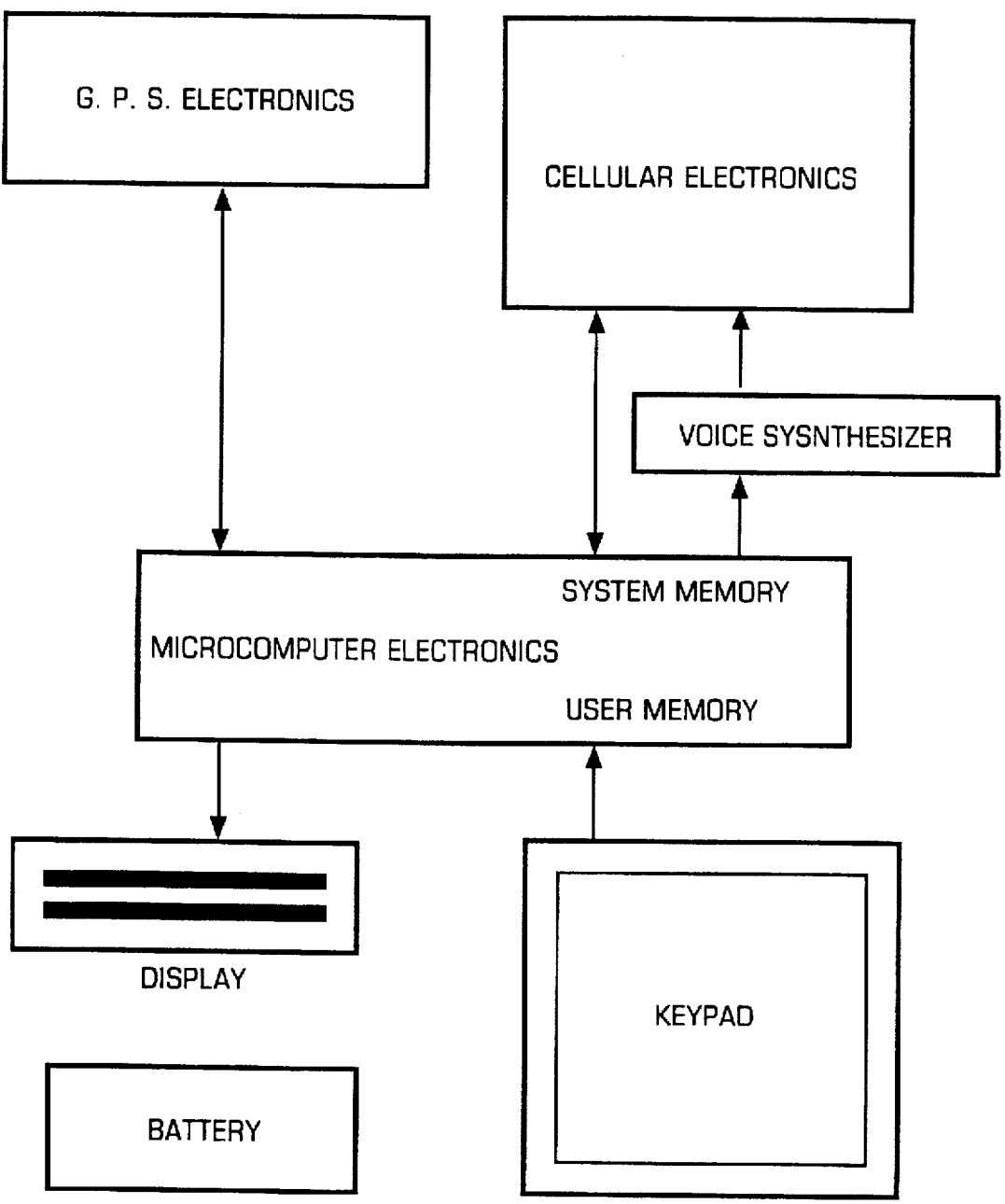
FIG. 1 provides a block diagram of a location reporting telephone. This phone is configured to receive GPS signals, with the GPS electronics controlled by a microcomputer, and transmitted to a base unit via the cellular electronics. The diagram further provides a voice synthesizer, which generates a pre-programmed message to the operator of the base unit. The microcomputer in this mobile unit is configured to decode the GPS signal into geographic position information and utilizes map data stored in its system memory, such that the mobile operator may display its geographic location information while the GPS signal is transmitted with the synthesized message or while the mobile operator is in audio contact with a base operator. The block diagram further provides a battery which powers the mobile unit.
Figure 2:
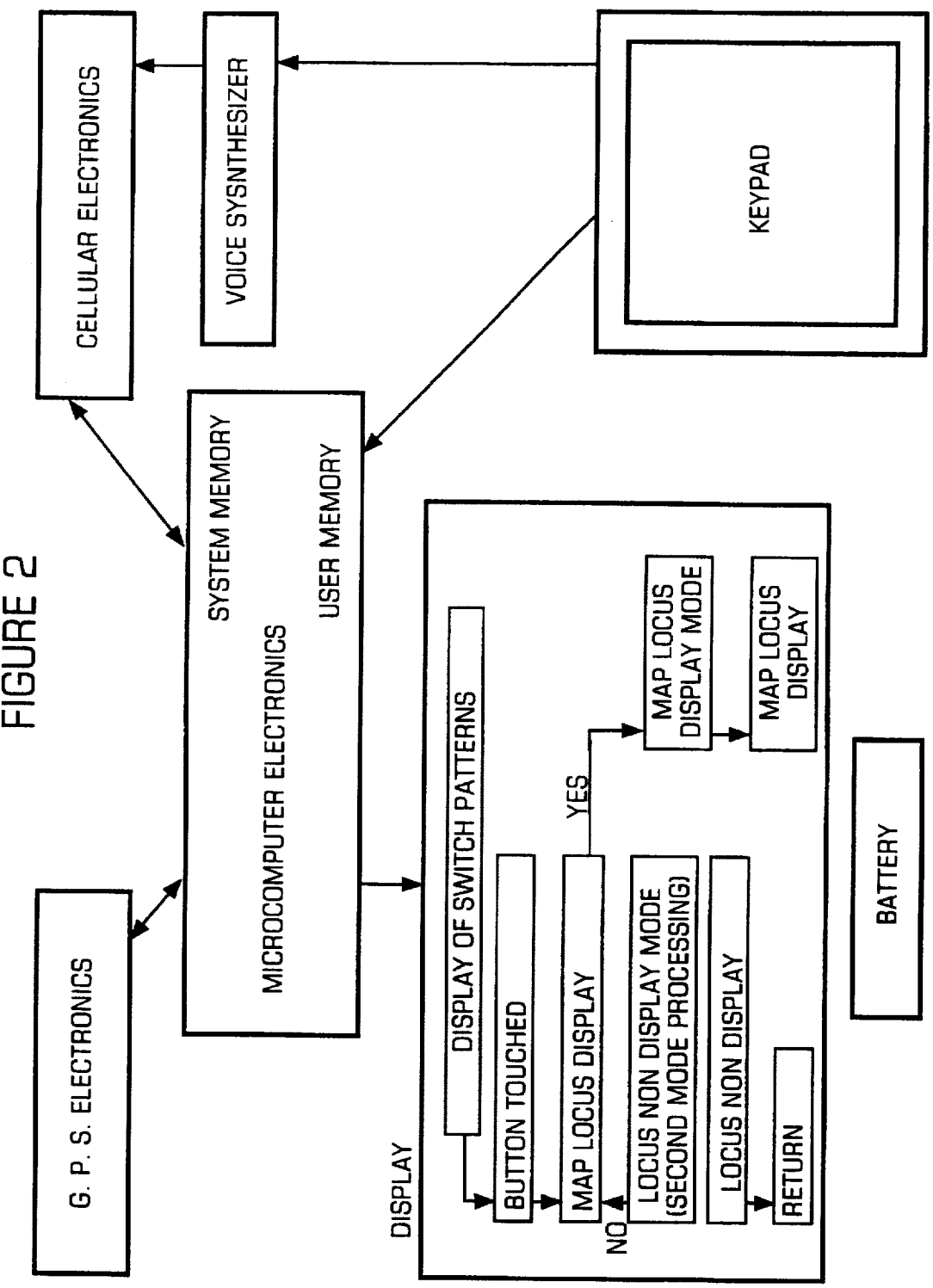
FIG. 2 provides a block diagram similar to the block diagram of FIG. 1, with the Display controls provided in greater detail. Specifically, the mobile operator is provided with a map that provides the locus of the vehicle in conjunction with the map display. The display can also provide a non-locus mode to the mobile phone operator.
Figure 3:
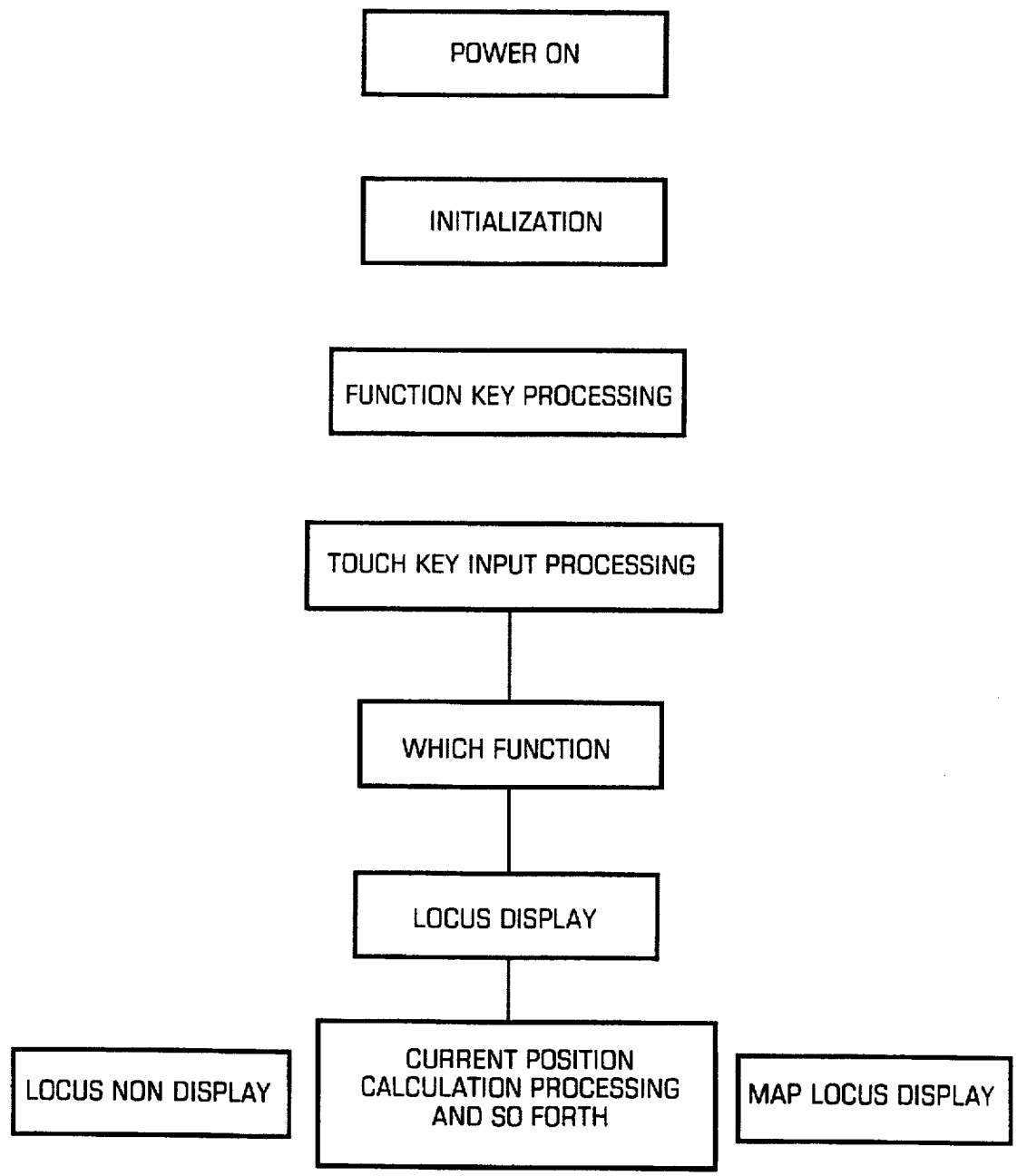
FIG. 3 provides a block diagram of the operation of the phones of FIGS. 1 and 2 as well as a base unit configured to receive GPS signals and audio communication via a telephone.
Figure 7:
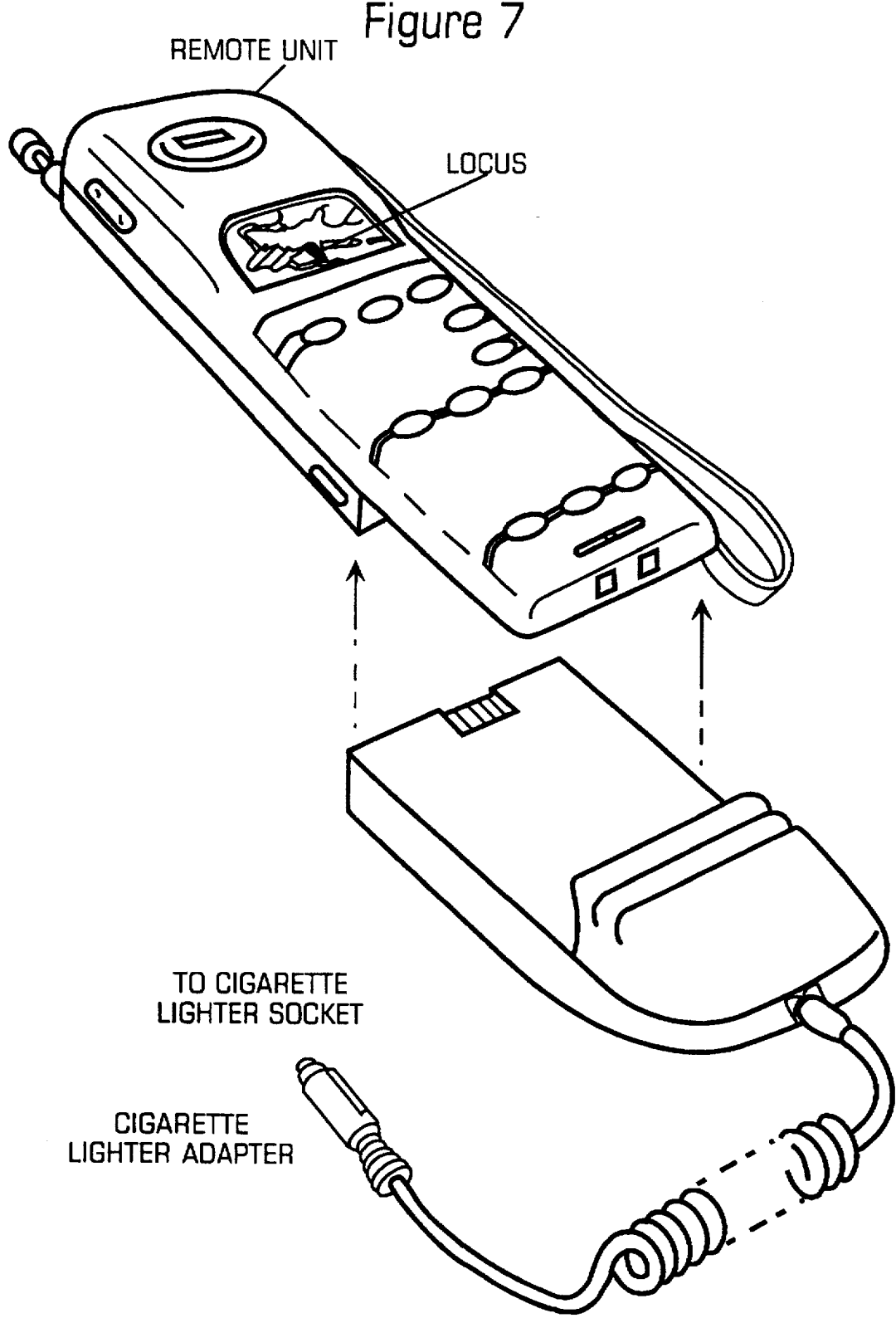
FIG. 7 provides a remote unit which contains a visual display means that is in the locus display mode.
Figure 8:
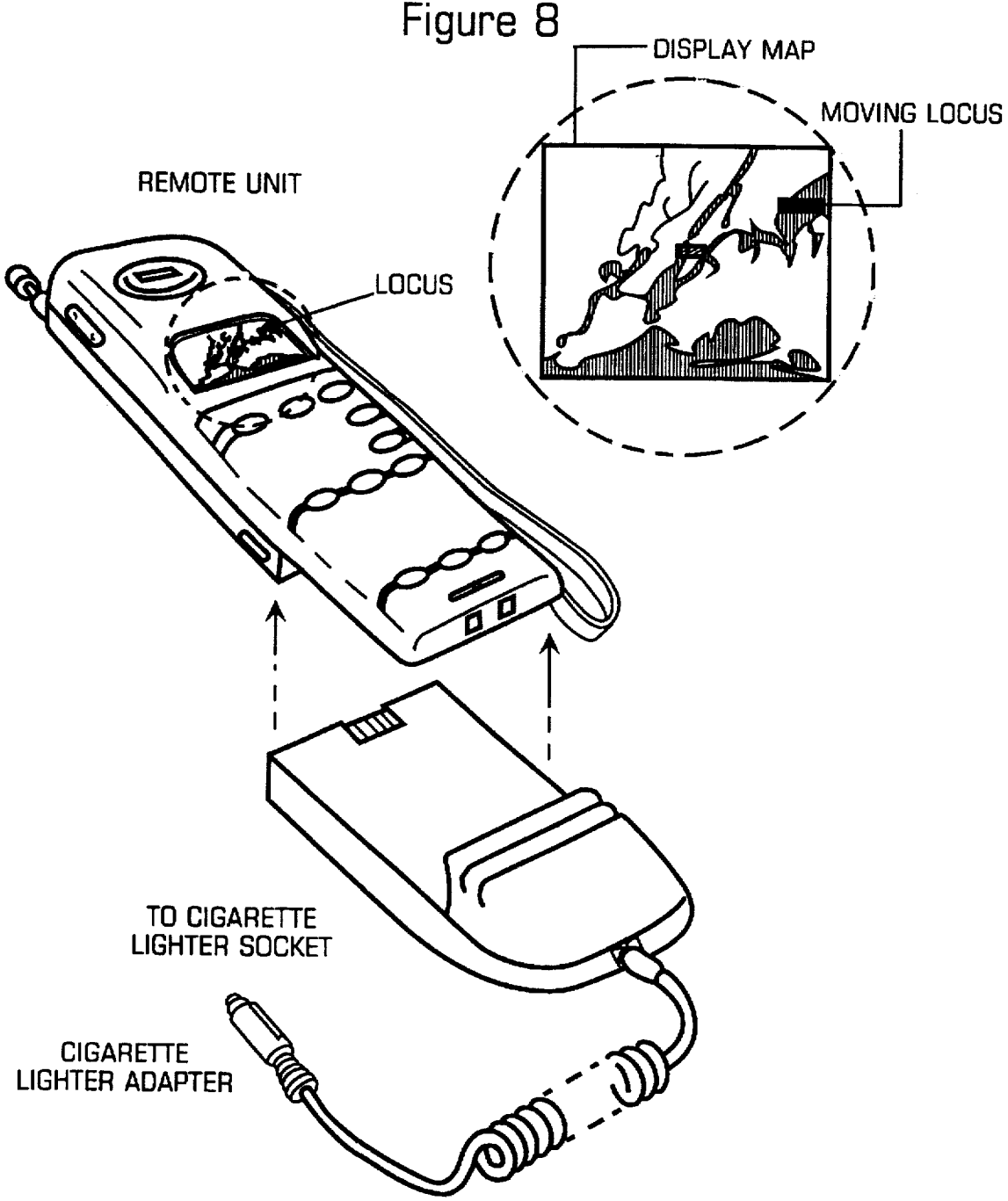
FIG. 8 provides a blow up of the visual display means of FIG. 7, demonstrating the moving locus.
Figure 9:
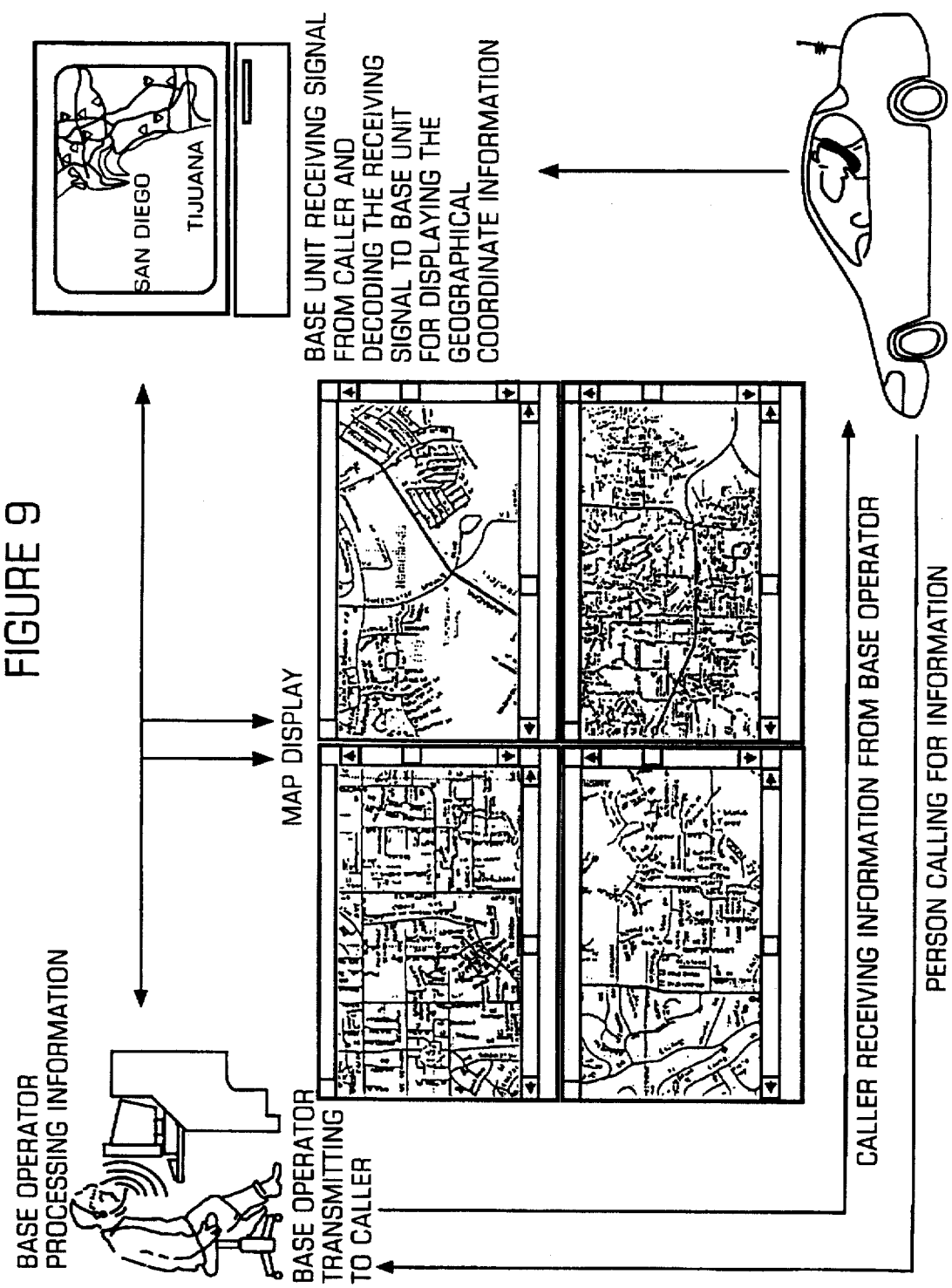
FIG. 9 provides a schematic diagram of how the base unit operator will provide the mobile operator with geographic location information.

The present invention allows for the full utilization of the cellular telephone and GPS location capability by mobile operators in an inexpensive and convenient manner. With a GPS decoding means located in a central base unit, along with a video display means and powerful computing means, as opposed to the mobile unit itself, provides for lower hardware costs to the purchaser of the mobile systems. In addition, the present invention enables a mobile operator to be in audio communication with a base operator while GPS information is transmitted in sequence with the audio signal to the base unit, the completed transmitted signal processed such that the audio signal is split from the GPS signal, with the GPS signal decoded in a base unit to latitude and longitude and the audio signal provided to the base operator. The latitude and longitude information is subsequently utilized to select detailed maps corresponding the particular latitude and longitude. These maps would be stored in a Read Only Memory that is either a chip or a compact disk (CD-ROM) and they would be displayed on a visual display means. The present invention also provides for the locus of the mobile operator to be visible on the map such that the base unit operator is able to provide the mobile unit operator with instructions or information based upon, and while, the mobile unit's geographic locus is provided on the base unit's screen.

The present invention provides a novel apparatus for providing geographic location information to an operator of a mobile communications unit comprising a mobile communications unit and a base communications unit. For the present invention, the mobile communications unit comprises a means for receiving a global positioning system signal, a means for processing said Global Positioning System (GPS) signal, and a cellular telephone means for transmitting said processed GPS signal, as well as a voice communication signal from said operator, and for receiving geographic position information. For the present invention the base communications unit comprises a cellular telephone means for receiving transmitted signals from said mobile unit, a means for processing said signals and extracting voice and global positioning information, an audio communication means utilizing said voice information and allowing an operator of said base unit to communicate with said mobile unit operator, and a decoding means for processing said global positioning information into geographic position information, and a visual display means for conveying said geographic position information to an operator, wherein said processing of said telephone signal at the base unit allows said base unit operator to be in audio communication with said mobile unit operator while simultaneously analyzing said visual display means. The telephone means which forms a part of the base unit is typically a landline-linked telephone, as it is anticipated that the base unit will ordinarily be in a fixed location. It will readily be appreciated that in certain embodiments it may be desirable to provide a base unit which can be relocated geographically. In such embodiments it may be desirable to provide a cellular telephone as the telephone means of the base unit. In such embodiment, the separated cellular telephone will establish the phone link, in a manner analogous to the ability of separate cellular phones to communicate, while remaining separate from the infrastructure of the cellular in place.

The majority of cellular systems in commercial use are analog signal based systems. However, it is envisioned that future cellular systems shall be digital-signal based systems. In a preferred embodiment of the present invention, the cellular telephone means is digital. Digital communications are communication systems which utilize digital signals, that is a time-varying or spatial signal represented as sequences or arrays of digitized samples, in the sending and receiving of messages.

In addition to the trend to use digital signals for land based cellular phones, the future trend in satellite communications is toward digital techniques as well. Frequency division multiplexing-frequency modulation-frequency division multiple access (FDM-FM-FDMA) has been the most popular analog technique used in commercial satellite systems because it has been field-proven and makes it easy to provide quality satellite links at a low cost. As the number of earth stations increases, the transponder capacity markedly in a FDM-FM- FDMA system. In addition, FDM-FM-FDMA is inflexible in responding to traffic changes. On the other hand, a digital satellite system such as quaternary phase shift keying-time division multiple access (QPSK-TDMA) can accommodate a large number of earth stations with only a small loss in transponder capacity. Furthermore, it can quickly respond to traffic variations. Also associated with digital satellite communications are techniques such as demand assignment and digital speech interpolation to further increase efficiency of telecommunications. Unlike an analog satellite system, a digital satellite system can employ error-correction coding to trade bandwidth for power. Finally, the use of code-division multiple access (CDMA) for low data rate applications enables users to employ micro earth stations (0.5-m antenna) at an extremely low cost ($3000)to obtain premium quality services. The flexibility of digital satellite system will make them even more promising when integrated digital networks become fully implemented.

The present invention further provides mobile communications units with additional elements. In a preferred embodiments the mobile communications unit further comprises a Read Only Memory which contains a destination-dedicated telephone number, said destination being said base unit. It is envisioned that this destination-dedicated number could be an office of the Automobile Association of America (AAA), a road information operator, an emergency number such as 911 or a combination of such dedicated numbers. The present invention would provide an operator of the mobile unit with the ability to initiate a call with pushing one button, wherein there would be a base unit configured to receive the pre-programmed call and an operator of the base unit could immediately pinpoint the location of the calling vehicle while providing the caller with information or instructions.

In a preferred embodiment the invention provides a mobile communications unit further comprising a means for decoding video data signals and a means for displaying visual images and a base communications unit further comprising a means for encoding video data into a telephone signal, wherein said geographic position information decoded by said base unit is provided to said mobile unit operator via visual images while said mobile unit operator communicates with said base unit operator.

In a preferred embodiments, the present invention further provides a base units' visual display means providing geographic position information utilizing maps. These maps or cartographic displays can include both two and three dimensional maps, with the base unit configured to display the locus of the mobile communications unit on the visual display in accordance with the scale of the map displayed on the visual display The display of the locus on the map would enable the base unit operator to affix the locus of the operator of the mobile unit on the cartographic display and provide the mobile operator with information or instructions even as the locus moves, if the mobile unit is in transit, on the screen.

It is contemplated that the visual display means will include both contemporary cathode ray tubes (CRT), flat screen display systems and High Definitions Television (HDTV) and other visual display means which are well known to those of ordinary skill in the art.

The invention further provides that a number of different types of maps may be displayed on the display means of the base unit, utilizing split screens, with the use of such split screens well known to those of ordinary skill in the art. Such maps could include, but are not limited to, United States Geological Survey topographic maps, air and sea charts, transportation maps and mercator projections. Moreover, the invention provides for a base unit utilizing ROM or CD-ROM technology for storing a detailed roster of maps, with the base unit able to activate a map based upon a decoded latitude and longitude signal. The base unit will have an additional display mode in which the map and the current position in latitude and longitude are displayed on the screen but the locus is not displayed on the screen. The present invention further provides a base unit that receives (SMR)special mobile radio signals, wireless communications signals, digital signals and land-based telephone communications in addition to cellular telephone calls such that it serves as a full service telecommunications unit, able to transfer the mobile operators call to police, fire or loved ones, if necessary. The means for receiving such signals and for configuring such a base unit are provided by the prior art such that one of ordinary skill in the art.

The invention further provides a decoder means for decoding the GPS signal into latitude and longitude; that is, geographic location/position data. The data will be utilized by a microprocessor which will be programmed to select map displays stored on a ROM or CD-ROM based upon the latitude and longitude. A modem will also be installed in said base unit that will activate the CD-ROM. The microprocessor will further control the display of the cartographic information on the video display means.

The maps shall provide base unit operators with detailed information about the surrounding areas of the received signal. The invention further provides a base unit configured to provide up-to-date information about residential streets, major roads, highways, and freeways. The invention further provides a base unit configure to overlay street maps on the United States Geographical Survey topographic maps to provide the base unit operator with more information at a glance or a touch of the base screen.

The invention further provides an emergency roadside GPS call box system which provides a portable hand-held or a mobile remote unit with a destination dedicated dialer pre-programmed to called a base unit as described hereinabove, to allow the base unit to calculate the geographical coordinates of person using the mobile unit and provide them with information and instructions. Such a call box would be configured with a cellular transmitted and receiver, a ROM with the pre-programmed telephone number and a means for initiating the call to the base unit.

The invention further provides that the pre-programmed call will be to a 911 number, with the audio signal provided by either the operator or by a pre-programmed synthesized message. This call box shall be configured to receive audio instructions or information from the unit operator.

The present invention provides a cellular telephone configured to provide a geographic position system signal to a base unit and simultaneously allow an operator of the base unit to be in voice communication with the operator of the cellular telephone comprising a means for receiving and transmitting signals via a cellular telephone system, a means for receiving a global positioning system (GPS) signal a means for processing said global positioning system signal, a means for configuring said global positioning system signal and an audio signal generated by an operator of said cellular telephone into a cellular telephone signal which can be processed by a base unit into an audio signal and a GPS signal that can be decoded into geographic position information.

The present invention also provides for a mobile cellular telephone which provides geographic location information comprising a means for receiving and transmitting signals via a cellular telephone system, a means for receiving a global positioning system signal, a means for generating a timing signal, a means for computing a location information signal from said global positioning signal and said timing signal, a Read Only Memory which stores map displays, wherein said computing means retrieves a map display from said Read Only Memory corresponding to said location information signal and encodes a video data signal, and a visual display means for displaying said video data signal. The present invention provides that this mobile unit shall have the visual display capabilities of the base unit, such that the mobile operator of this telephone may be in contact with a base operator with a base unit such that both a base unit operator and the mobile unit operator shall have visual displays of the location of the mobile unit operator and the base unit operator may provide information and instructions to the mobile telephone operator while receiving the geographic information signal from the mobile operator.

EXAMPLES

There are three examples of the present invention which are adaptations of the Data Logger System. The first example is the Portable Remote Station. The second example is the Vehicular Remote Station. This system is an adaptation of a Portable Remote System. The third example is the Cellular Remote Station, which is based on a modification of the Portable Remote System architecture to include Digital Global Position System (DGPS) and cellular phone capabilities.

Example 1

Figure 10:
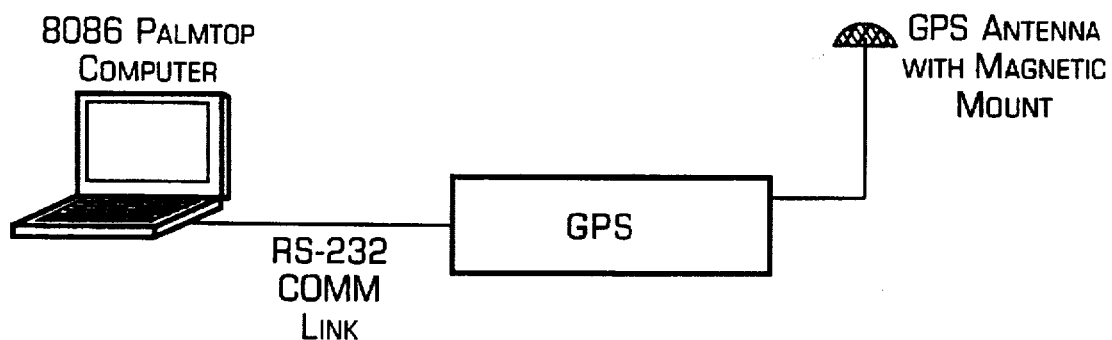
FIG. 10 provides a block diagram of a Portable Remote Station. The primary elements are a Palmtop Personal Computer, a GPS, and a GPS antenna with a magnetic mount.

The Portable Remote Station is an adaptation of a Data Logger System. A block diagram of the Portable Remote Station is shown in FIG. 10. The elements of this example include a GPS receiver and the Palmtop Personal Computer (PC) with specialized application software. Such software is derived from the data logger software.

The Palmtop PC extracts present position, satellite information, and other data from the GPS receiver via an RS-232 Interface. Through a Palmtop PC user interface, the operator may create or "mark" particular locations with position "tags." Each location is "tagged" with data extracted from the GPS receiver and annotated with identifying information. Up to 80 characters of text may be stored for each location annotated. The PC can handle hundreds of these position tags. The number is limited only by the computer's memory.

The Palmtop PC and GPS antenna are assembled together in a lightweight carrier. The GPS antenna is magnetically mounted to the assembly to allow removal for placement at locations providing better satellite visibility. Three modes of operation are available from the Palmtop Data Logger Portable Remote Station: (1) Continuous Logging Mode, which provides a minimum of 30 minutes of continuous logging time; (2) Abbreviated Annotation Mode, which involves reprogramming the Palmtop PC function keys to expedite logging activities; and (3) Discrete Logging Mode, which provides the user with the ability to log hundreds of discrete, fixed points which define locations of observables such as houses, fire hydrants, or telephone poles.

Figure 11:
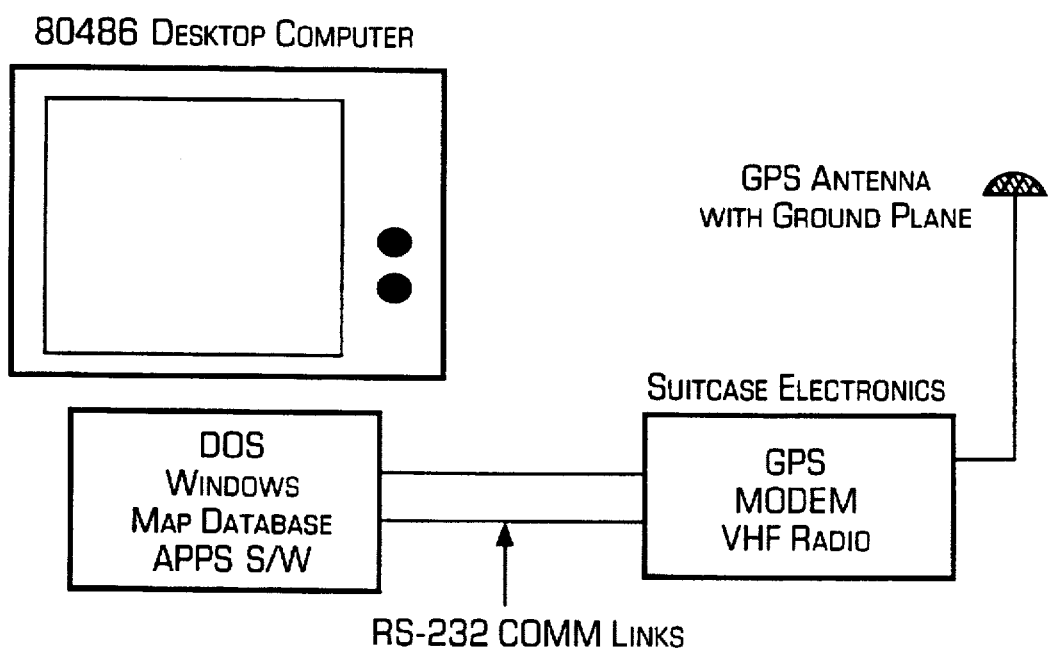
FIG. 11 provides a block diagram of the Base Station. The primary elements of the Base Station are the Desktop Computer with application software, the Suitcase Electronics, and the GPS Antenna System. The Suitcase Electronics includes a GPS, a modem, and a VHF Radio.

A block diagram of the Base station is provided in FIG. 11. This configuration is based on a ISPS receiver and various other readily available, low cost elements.

The Portable Remote System is returned to the Base Station after each data logging session. The Base Station is then used to extract the field data from the Portable Remote. After extraction, the Base Station processes the data, making appropriate accuracy corrections, and generates a data base of geographic points with associated annotation text. Each location in the data base is measured to between 3 and 5 meter accuracy. The user can use this data base to generate reports with precise position, time, and with annotation text.

The Base Station supports the construction and manipulation of geographic data bases by adding, deleting, or editing selected geographic data bases into a map environment. The map environment provides a display of multiple overlays for simultaneously viewing different cartographic representations of the location from which the remote unit is operating. For example the first overlay may display main roads, the second may display secondary roads, and the third may display the geographic data base.

The Base Station architecture has bi-directional communications between the Portable Remote and the Base Station via a telephone link. DGPS corrections data is sent from the Base Station to the Portable Remote and position information is sent from the Portable Remote to the Base Station.

Example 2

Figure 12:
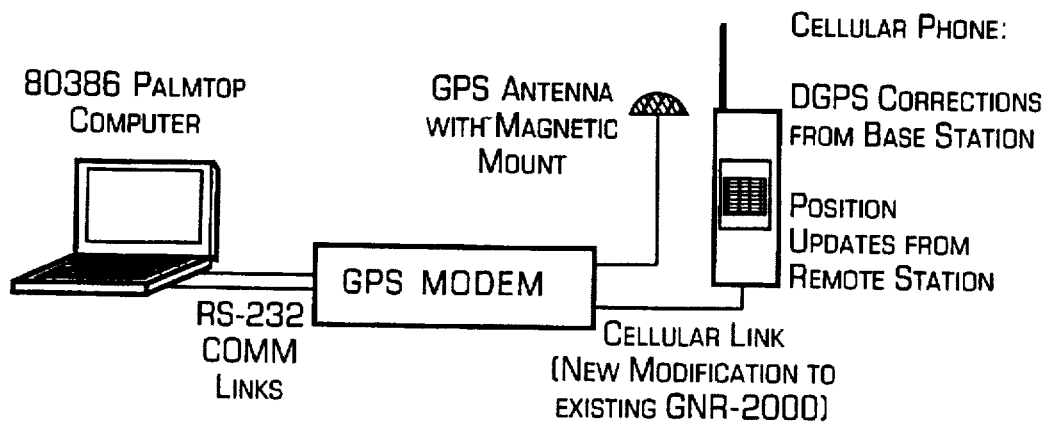
FIG. 12 provides a block diagram of a Cellular Remote Station. The primary elements are a Palmtop Personal Computer, a GPS and modem, a GPS antenna with a magnetic mount, a cellular phone, and a cellular phone link. The cellular phone receives Digital GPS corrections from the Base Station over the cellular link and transmits position updates from the Cellular Remote to the Base Station.

The Cellular Remote Station is the second example of the invention based on the Data Logger System. A block diagram of the Cellular Remote Station is shown in FIG. 12. The Cellular Remote Station has the same architecture as the Portable Remote Station, however it has one additional element, a cellular phone link.

The cellular phone link provides the Cellular Remote with the enhanced capability to communicate with the Base Station in the field via the cellular phone link. Once a communications link is established, the Cellular Remote shall receive DGPS corrections messages from the Base Station, calculate differential position, and transmit the present differentially corrected position back to the Base Station. The Cellular Remote Station has the same modes of operation as the Portable Remote Station.

Figure 13:
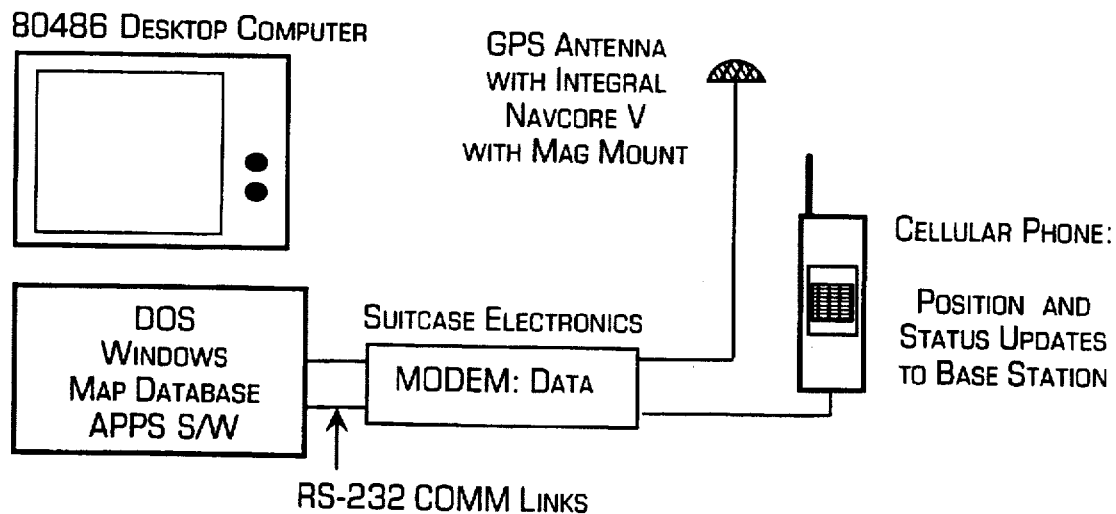
FIG. 13 provides a block diagram of the Base Station with Telephone Link. The primary elements of the Base Station with Telephone Link are the Desktop Computer with application software, the Suitcase Electronics, and the GPS Antenna System. The Suitcase Electronics subsystem includes a GPS, a modem, and a VHF Radio.

The Base Station has the capability to communicate with either the Cellular Remote or the Vehicular Remote units via a cellular phone link as provided in FIG. 13. The GPS receiver at the Base Station is used to generate Differential GPS corrections and to transmit them to the Portable Remote in lieu of the FM sub-carrier receiver. An appropriate map of the operational area is integrated into the Base Station. The GPS receiver is required here to enable the Base Station to generate DGPS corrections and transmit to the Portable Remote over the cellular link.

Example 3

The Vehicular Remote Station is the third example of the invention based on the Data Logger System. It is another remote capability, differing from the Portable Remote in its capacity to accept differential corrections over an FM sub-carrier link. The Vehicular Remote architecture is based on the architecture of the Portable Remote, see FIG. 14.

The Vehicular Remote consists of a GPS Receiver, a GPS patch antenna with magnetic mount, and a Laptop PC with specialized application software. The Vehicular Remote Station provides the same functions as the Portable Remote Station with the following additional features: (1) an automated map showing present position and a previously generated data base generated using the Portable Remote (i.e., new roads, houses, water mains, etc.); and (2) differential GPS, specifically, differential accuracy corrections achieved using the FM Sub-Carrier signal.

The Vehicular Station includes a FM Sub-Carrier station which consists of a separate PC used to generate DGPS corrections. At the Base Station, a modem converts digital signals to a tone pair which is then sent via a telephone line to a local FM radio station. The FM radio station will then transmit the correction signals to the operational area via the FM sub-carrier frequency.

The Vehicular Remote architecture includes an FM Sub-Carrier Receiver and a modem. Using the FM Sub-Carrier broadcasted by the FM station, the Vehicular Remote receives the analog FM corrections signals transmitted by the FM radio station. The modem converts the correction signals to digital messages which are then reformatted for use by the GPS. The GPS uses this correction when generating the position solution.

All publications and patent applications cited in this specification, but not individually and specifically incorporated by reference, are herein incorporated by reference as if they had been specifically and individually indicated to be incorporated by reference.

Although the foregoing invention has been described in some detail by way of illustration and example for purposes of clarity and understanding, it will be apparent to those of ordinary skill in the art in light of the teaching of this invention that certain changes and modifications may be made thereto without departing from the spirit or scope of the claims.

What is claimed is:

1. A mobile communications system for providing geographic location information and voice communication comprising:

a mobile communications unit comprising means for receiving global positioning system signals; means for processing said global positioning system signals; and a cellular telephone means for simultaneously transmitting said processed global positioning system signals and voice communication signals from an operator of the mobile communications unit;

and a base communications unit comprising a telephone means for receiving processed global positioning system signals and voice communications signals from said mobile communications unit through said mobile communications system, means for simultaneously processing said signals and extracting voice and global positioning information; means for transmitting global positioning update data to said cellular telephone means through said mobile communications system a decoding means for processing said global positioning information into geographic position information; and a visual display means for conveying said geographic position information to an operator; and an audio communications means utilizing said voice information and allowing an operator of said base unit to communicate with said mobile unit operator while simultaneously analyzing said geographic positioning information on said visual display means.

2. The mobile communication system of claim 1, wherein said cellular telephone means is digital.

3. The mobile communication system of claim 1, wherein said visual display means provides geographic position information utilizing maps.

4. The mobile communication system of claim 1, wherein said mobile communications unit further comprises a Read Only Memory containing a destination-dedicated telephone number, said destination being said base unit.

5. The mobile communication system of claim 1, wherein said mobile communications unit further comprises means for decoding video data signals and a means for displaying visual images and said base communications unit further comprises a means for encoding video data into a telephone signal, wherein said geographic position information decoded by said base unit is provided to said mobile unit operator via visual images while said mobile unit operator communicates with said base unit operator.

6. A cellular telephone configured to provide a geographic position system signal to a telephone means associated with a base communications unit and simultaneously allow an operator of said base communications unit to be in voice communication with the operator of said cellular telephone while displaying said geographic position system signals comprising:

means for receiving and transmitting signals via a cellular telephone system;

means for receiving a global positioning system (GPS) signal;

means for processing said global positioning system signal; and means for combining said global positioning system signal and an audio signal generated by an operator of said cellular telephone into a combined cellular telephone signal which is processed by said base communications unit into an audio signal and a GPS signal so that said base communications unit simultaneously decodes said GPS signal into geographic position information displayed by said base communications unit and establishes voice communications between said base communications unit and said cellular telephone.

7. A mobile cellular telephone which provides geographic location information comprising:

means for receiving and transmitting signals comprising both voice and global positioning system signals via a cellular telephone system capable of communicating with a telephone means associated with a base communications unit;

means for receiving a global positioning system signal from said base communications unit;

means for generating a timing signal;

means for computing a location information signal from said global positioning signal and said timing signal;

a Read Only Memory which stores map displays, wherein said computing means retrieves a map display from said Read Only Memory corresponding to said location information signal and encodes a video data signal; and a visual display means for displaying said video data signal.

8. A mobile communications system for providing geographic location information and voice communication comprising:

a mobile communications unit comprising
a global positioning system receiver;
a signal processor for processing said global positioning system signal;
a cellular telephone transmitter; and
a cellular telephone receiver, wherein said transmitter transmits said processed global positioning system signal and a voice communication signal from said mobile unit operator; and a base communications unit comprising
a telephone receiver for receiving transmitted signals from said mobile unit, a signal processor for processing said signals and extracting voice and global positioning information;

a transmitter for allowing an operator of said base unit to communicate with said mobile unit operator;

a decoding algorithm for processing said global positioning information into geographic position information; and a visual display for conveying said geographic position information to an operator;

wherein said processing of said telephone signal at the base communications unit allows said base unit operator to be in audio communication with said mobile communications unit operator while simultaneously analyzing said visual display.

9. A cellular telephone configured to provide a geographic position system signal to a telephone means associated with a base communications unit and simultaneously allow an operator of said base communications unit to be in voice communication with the operator of said cellular telephone comprising:

a cellular telephone transmitter and receiver;

a global positioning system (GPS) receiver for generating a global positioning system signal;

a signal processor for processing said global positioning system signal; and means for combining said global positioning system signal and an audio signal generated by an operator of said cellular telephone into a single cellular telephone signal which can be processed by said base communications unit into an audio signal and a GPS signal that can be decoded by said base communications unit into geographic position information.

10. The system of claim 1, wherein said telephone means of said base communications unit is a landline-linked telephone.

11. The system of claim 8, wherein said telephone means of said base communications unit is a landline-linked telephone.

12. The system of claim 8, wherein said cellular telephone means is digital.

13. The system of claim 8, wherein said visual display means provides geographic position information utilizing maps.

14. The system of claim 8, wherein said mobile communications unit further comprises a Read Only Memory containing a destination-dedicated telephone number, said destination being said base unit.

15. The system of claim 8, wherein said mobile communications unit further comprises means for decoding video data signals and means for displaying visual images;

and said base communications unit further comprises means for encoding video data into a telephone signal, wherein said geographic position information decoded by said base unit is provided to said mobile unit operator via visual images while said mobile unit operator communicates with said base unit operator.

* * * * *